Figure 1:
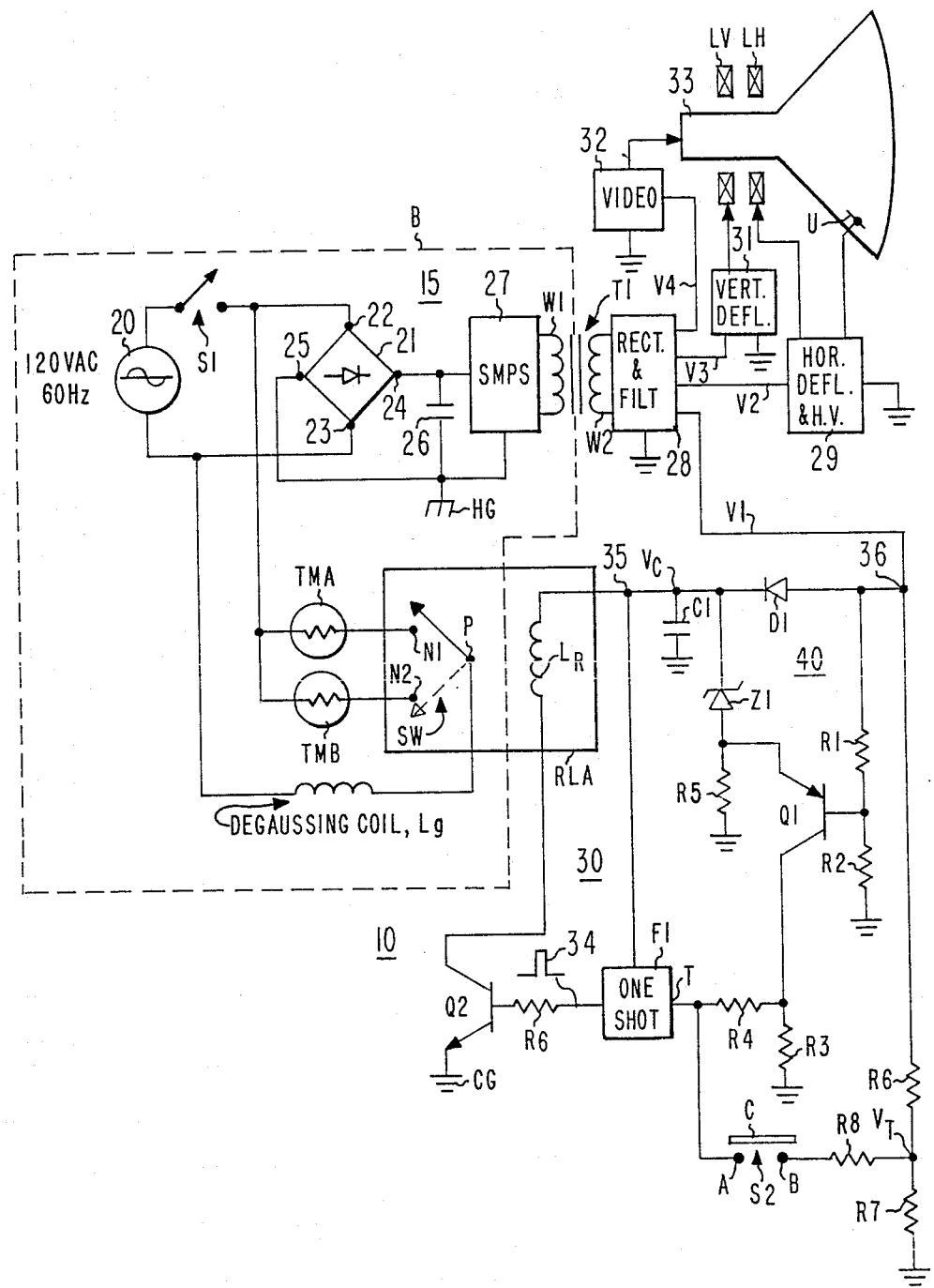

United States Patent [19]

Truskalo

[11] Patent Number: 4,760,489

[45] Date of Patent: Jul. 26, 1988

[54] VIDEO DISPLAY DEGAUSSING APPARATUS

[75] Inventor: Walter Truskalo, Titusville, N.J.

[73] Assignee: RCA Licensing Corporation, Princeton, N.J.

[21] Appl. No.: 60,898

[22] Filed: Jun. 12, 1987

[51] Int. Cl.⁴ .................... H01F 13/00; H01H 47/00
[52] U.S. Cl. ......................................... 361/150; 315/8
[58] Field of Search ..................... 361/150, 156; 315/8

[56] References Cited

U.S. PATENT DOCUMENTS 3,495,136  2/1970  Gerritsen ........................... 361/150
3,845,442  10/1974  Ihaya ..................................... 315/8

FOREIGN PATENT DOCUMENTS 0134585  7/1985  Japan ................................... 361/150

Primary Examiner—L. T. Hix
Assistant Examiner—David Porterfield
Attorney, Agent, or Firm—Eugene M. Whitacre; Paul J. Rasmussen; Joseph J. Laks

[57] ABSTRACT

A degaussing apparatus for a video display includes a degaussing coil and a source of degaussing current. A switching means is coupled to the degaussing coil and to the source for providing a path for degaussing current between the source and coil during a degaussing operation. First and second PTC elements, functioning as degaussing current reducing means, are coupled to the degaussing coil and to the switching means. The switching means produces alternate coupling of the first and second PTC elements to the degaussing coil with respect to successive degaussing operations.

10 Claims, 2 Drawing Sheets

VIDEO DISPLAY DEGAUSSING APPARATUS

This invention relates to a degaussing apparatus for a video display.

When positive temperature coefficient (PTC) resistors and thermistors are used to generate the degaussing current for a picture tube in a video display apparatus, a relatively long cooling interval is required before the next degaussing operation may be initiated. In a video display apparatus such as a video monitor, it may be desirable to provide a capability for manual degaussing or degaussing on command immediately after completion of the first degaussing operation, without waiting for the thermistor to cool.

According to a feature of the invention, to provide immediate, subsequent degaussing, a switching means is coupled to a degaussing coil arrangement and to a source of degaussing current for providing a degaussing current path during a degaussing operation. First and second degaussing current reducing elements are coupled to the degaussing coil arrangement and to the switching means for alternately coupling the first and second degaussing current reducing elements to the degaussing coil arrangement with respect to successive degaussing operations.

When the video display apparatus is, for example, a portable color television receiver that may be moved from one viewing location to another, it may be desirable to provide the alternate coupling automatically without the need for manual intervention. In accordance with another aspect of the invention, the control circuit for the switching means is activated in response to a signal indicative of a power status of a power supply for the video display. The control circuit then produces the alternate coupling in accordance with the status of the power supply.

In carrying out an aspect of the invention, the degaussing apparatus may be manually operated in conjunction with the switching means for manually initiating a degaussing operation in a manner that produces the alternate coupling. To provide the manual operation, a manually operated switch may be used to activate the control circuit of the switching means independently of the power status indicative signal.

Figure 2:
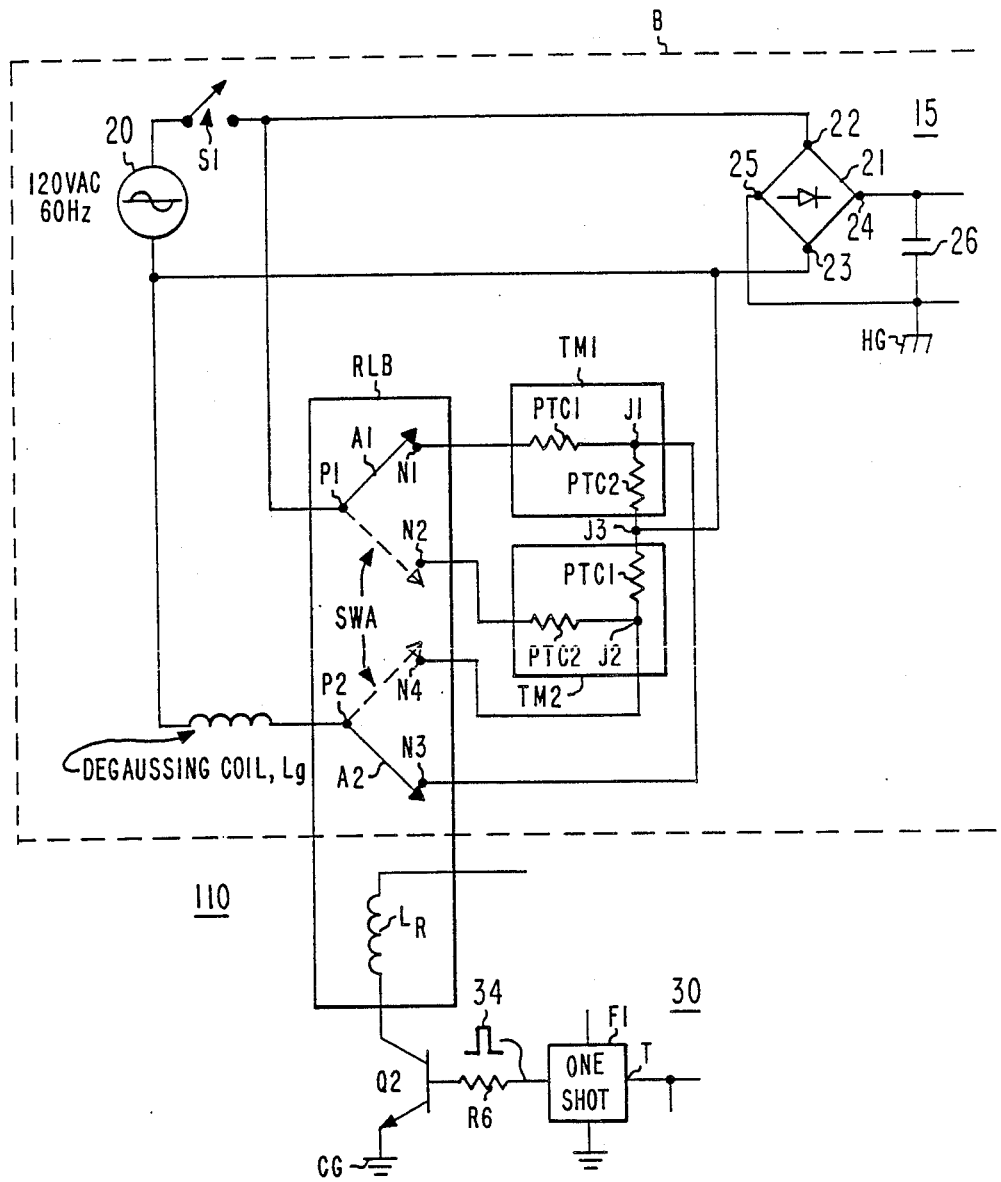

FIG. 1 illustrates video display circuitry that includes degaussing apparatus in accordance with the invention; and FIG. 2 illustrates a portion of the video display circuitry of FIG. 1 that includes a different embodiment of the degaussing apparatus.

In the video display apparatus of FIG. 1, a source 20 of AC mains voltage is coupled between input terminals 22 and 23 of a full-wave bridge rectifier 21 of a power supply 15. An on/off mechanical switch S1 is interposed between mains voltage source 20 and bridge input terminal 22. A filter capacitor 26 is coupled between an output terminal 24 of bridge rectifier 21 and a current return terminal 25 for developing an unregulated DC voltage at output terminal 24 relative to a ground terminal HG that is at a common potential with current return terminal 25. Ground terminal HG is a hot-ground, electrically nonisolated with respect to shock hazard isolation from AC mains source 20.

The unregulated DC voltage developed at terminal 24 is applied to a switched mode power supply 27. A primary winding W1 of a switching transformer T1 is coupled to switched mode power supply 27, and a secondary winding W2 is coupled to a rectifier and filter stage 28. Although illustrated in FIG. 1 as a single winding, secondary winding W2 may comprise multiple windings and taps that are coupled to rectifier and filter stage 28.

Primary winding W1 is conductively coupled to hot ground HG in such a manner as to be electrically nonisolated from AC mains source 20. Secondary winding W2, however, is electrically isolated from AC mains source 20 and is conductively coupled to a point of reference potential or cold-ground CG that is isolated from hot ground HG. Transformer T1 is therefore constructed in a manner that provides an electrical shock hazard isolation barrier B between the circuitry enclosed within the dashed line box of barrier B and the remaining circuitry of FIG. 1.

Rectifier and filter stage 28 develops a plurality of regulated DC voltages V1–V4, each referenced to cold-ground potential CG. Voltage V4 energizes a video stage 32 that provides video information signals to a picture tube 33. Voltage V3 energizes a vertical deflection circuit 31 that generates vertical scanning current in a vertical deflection winding LV. Voltage V2 energizes a horizontal deflection and high voltage circuit 29 that provides horizontal scanning current to a horizontal deflection winding LH and that provides an ultor voltage to an ultor terminal U of picture tube 33.

The video display circuitry of FIG. 1 also includes a degaussing apparatus 10 embodying the invention. Degaussing apparatus 10 includes a degaussing coil $L_g$ of conventional design, two positive temperature coefficient of resistance thermistors, TMA and TMB, a relay RLA and a control circuit 30 that energizes relay coil $L_R$ for actuating the mechanical switch section SW of the relay.

Relay RLA is a single-pole, double-throw latching type relay. When current is made to flow through relay coil $L_R$, the arm of switch SW is caused to move from one of the contact terminals N1 and N2 to the other contact terminal. The arm remains latched in the newly thrown position even when current is removed from coil $L_R$ and the coil is deenergized. A subsequent energization of relay coil $L_R$ causes the arm of switch SW to be thrown back to its previous contact terminal position. The arm will stay in that position even after the coil becomes deenergized. In this manner, relay RLA provides the double-throw action of switch SW. Alternatively, a set-reset, dual coil, two-pole-two-throw (two-switch), magnetic latch relay may be used, similar in design to T351-2C-2/24VDC, manufactured by Allied Control Relays. The set and reset coils of the latch relay would be connected to transistor 30 and one of the two relay switches so as to control the operation of the other switch in the same manner as described above for controlling switch SW.

One terminal of degaussing coil $L_g$ is coupled to pole P of relay switch SW. The other terminal of degaussing coil $L_g$ is coupled to the terminal of AC mains source 20 that is remote from on/off switch S1. PTC thermistor TMA and TMB are connected in parallel, each having a first terminal coupled to the contact terminal of on/off switch S1 remote from AC mains source 20. The second terminal of thermistor TMA is coupled to contact terminal N1 of relay switch SW, whereas the second terminal of thermistor TMB is coupled to contact terminal N2.

A degaussing operation may be initiated by closure of on/off switch S1. By way of example, assume that the arm of switch SW is in the throw position where the arm makes contact with terminal N1, and further assume that both thermistors TMA and TMB are cold. Each thermistor therefore initiately exhibits a very low resistance value.

When on/off switch S1 is closed, placing thermistor TMA in series with degaussing coil $L_g$ across AC mains source 20, the arm of switch SW provides a path for degaussing current between degaussing coil $L_g$ and source 20. As degaussing current flows in thermistor TMA, the thermistor self heats to cause its resistance value to increase and reduce the amplitude of the degaussing current. After several cycles of degaussing current, the resistance of the thermistor has greatly increased, lowering the amplitude of the degaussing current to a small residual value, thereby completing the degaussing operation.

A relay switch control circuit 30 provides for the energization of relay coil $L_R$. Control circuit 30 includes a switching transistor Q2 and a one-shot monostable F1 coupled to the base of Q2 via a resistor R6. A DC voltage $V_c$ provides the supply voltage for one shot F1 and for relay current in coil $L_R$. Supply voltage $V_c$ is developed across a filter capacitor C1 and is derived from the switched mode power supply secondary voltage V1 that is applied to the capacitor via a diode D1.

To produce degaussing on command or to initiate a manually operated degaussing operation, a push button switch S2 is provided, with a contact terminal A being coupled to the trigger input terminal T of one-shot F1. A contact terminal B is coupled via a resistor R8 to the junction of voltage dividing resistors R6 and R7 that form a voltage divider of supply voltage V1.

To initiate a manual degaussing operation, contact arm C of switch S2 is depressed, applying to trigger terminal T the voltage $V_T$ developed at the junction of voltage dividing resistors R6 and R7. One-shot F1 is responsive to the positive going edge of the trigger voltage developed at terminal T when switch S2 is depressed. When one-shot F1 is triggered, it develops a pulse 34 that switches transistor Q2 into conduction. Relay current flows in coil $L_R$ from terminal 35 to cold ground CG via switch Q2. With coil $L_R$ energized, the arm of switch SW is caused to move and make contact with terminal N2, as indicated by the dashed-line position of the wiper arm of switch SW. The duration of pulse 34 need be no longer than that required to move and latch the arm of switch SW to its new contact position.

With the arm of switch SW contacting terminal N2, thermistor TMB is now in-circuit with AC mains voltage source 20 and degaussing coil $L_g$. Assuming thermistor TMB were not used in an earlier degaussing operation, the thermistor is cold and exhibits a low initial resistance to degaussing current. Normal degaussing operation may then take place.

A manual degaussing operation may therefore be performed at any time subsequent to closure of on/off switch S1 and completion of the initial degaussing operation associated therewith. By using the inventive degaussing arrangement that alternately couples thermistors TMA and TMB in-circuit with degaussing coil $L_g$, long waiting periods between two successive degaussing operations are avoided.

In accordance with another aspect of the invention, the alternate coupling of thermistor TMA and TMB in-circuit with degaussing coil $L_g$ may be performed automatically without manual intervention. The need for automatic operation may arise in a situation where a portable color television receiver is moved from one viewing location to another. A degaussing operation may be performed at the new location without waiting for a thermistor cooling period to elapse.

In carrying out this aspect of the invention, control circuit 30 includes a trigger circuit 40 that activates one-shot F1 in accordance with an electrical signal that is automatically generated. Trigger circuit 40 includes a transistor Q1 having a collector coupled to trigger input T of one-shot F1 via resistor R4 and coupled to ground via resistor R3. The base of transistor Q1 is coupled to the junction of voltage dividing resistors R1 and R2 that form a voltage divider of the voltage V1 developed at terminal 36. Voltage $V_c$ is coupled to the emitter of transistor Q1 via a zener diode Z1. A resistor R5 is coupled between ground and the junction of zener diode Z1 and the emitter of transistor Q1.

When the portable television receiver is moved from a given location, AC mains source 20 will be disconnected from power supply 15, when, for example, on/off switch S1 is opened or the mains plug is removed from the mains outlet. Immediately upon mains disconnection, the power supply secondary voltages including voltage V1 begin to fall toward 0V. The voltage $V_c$ developed at terminal 35 is sustained by capacitor C1 at or near its normal voltage level of V1, provided the capacitor is of large value. Diode D1 becomes reversed biased, disconnecting terminal 35 from terminal 36.

When voltage V1 developed at terminal 36 decreases sufficiently to place the base of transistor Q1 at 1VBE less than the emitter voltage of $V_c$-$V_{Z1}$, transistor Q1 turns on. A trigger voltage is generated at terminal T, with the positive going edge triggering one-shot F1 into generating pulse 34. Transistor Q2 turns on, energizing relay coil $L_R$ and actuating switch SW to move its arm from terminal N1, for example, to terminal N2.

Thermistor TMB is now coupled in-circuit with degaussing coil $L_g$. When switch S1 is subsequently closed at the new viewing location, degaussing operation commences immediately upon switch closure without the need for any waiting period, since the cold thermistor TMB is now in-circuit with degaussing coil $L_g$.

The value of capacitor C1 is chosen large enough to sustain voltage $V_c$ at a level adequate to: (a) maintain transistor Q1 conducting long enough to trigger one-shot F1, (b) maintain one-shot F1 energized for the duration of pulse 34, and (c) provide adequate current to relay $L_R$ for a long enough period to throw and latch switch SW in its alternate contact position.

When power supply 15 is reenergized after the portable television receiver is moved to its new location, the normal voltage level for supply voltage V1 is reestablished at terminal 36, enabling capacitor C1 to recharge via diode D1 to its normal voltage level. Control circuit 30 is restored to a condition that enables it to respond to a manual, degaussing-on-command closure of push button switch S2.

Relay RLA is constructed in a manner that provides an electrical shock hazard isolation barrier for the cold-side relay coil section and the circuitry associated therewith. This arrangement advantageously permits power status information of power supply 15 to be transmitted to trigger circuit 40 across the isolation barrier of switched mode transformer T1. The transmitted information is used to actuate hot-side relay switch SW situated on the hot-side of the isolation barrier provided by relay RLA.

FIG. 2 illustrates a portion of the circuitry of FIG. 1 including a different inventive embodiment 110 for the degaussing apparatus. Items in FIGS. 1 and 2 similarly identified function in a similar manner or represent similar quantities.

In FIG. 2, each of thermistors TM1 and TM2, corresponding to thermistors TMA and TMB of FIG. 1, comprises a dual PTC arrangement of a positive temperature coefficient of resistance element PTC1 in shunt with a positive temperature coefficient of resistance element PTC2. When coupled in-circuit with degaussing coil $L_g$, PTC1 is in a series relationship with the degaussing coil, and PTC2 is in a shunt relationship. For each thermistor, PTC2 is in thermal contact with PTC1 and the heat produced by PTC2 produces an additional rise in the temperature of PTC1. This results in a lower residual current in PTC1 and degaussing coil $L_g$.

Relay RLB provides the alternate coupling of thermistors TM1 and TM2 to degaussing coil $L_g$. The relay comprises a double-pole, double-throw switch SWA. Pole P1 is coupled to the terminal of on/off switch S1 remote from AC mains source 20, and pole P2 is coupled to degaussing coil $L_g$. Contact terminals N1 and N2, associated with pole P1, are coupled to PTC1 of thermistor TM1 and PTC2 of thermistor TM2, respectively. Contact terminals N3 and N4, associated with pole P2, are coupled to the internal thermistor junction terminals J1 and J2, respectively. The external juncture J3 of PTC1 of thermistor TM2 and PTC2 of thermistor TM1 is coupled to AC mains source 20 at a point remote from switch S1.

Arms A1 and A2 are constructed for ganged operation, and in the solid-line throw position, connect pole P1 to terminal N1 and pole P2 to terminal N3, and in the alternate throw position, illustrated in dashed-line, connect pole P1 to terminal N2 and pole P2 to terminal N4. In the throw position of switch SWA shown by the solid-line arms A1 and A2, thermistor TM1 is coupled in-circuit with degaussing coil $L_g$. Control circuit 30, partially shown in

I claim: FIG. 2, operates in the same manner as in FIG. 1. Thus, when control circuit 30 is activated either manually or automatically to energize relay coil $L_R$ of relay RLB, switch SWA is thrown to the alternate contact position that couples the cold thermistor, TM1 or TM2 as appropriate, in-circuit with degaussing coil $L_g$. A degaussing operation is initiated immediately without the need to resort to a waiting period.

1. A degaussing apparatus for a video display comprising:
   a degaussing coil arrangement;
   a source of degaussing current;
   switching means coupled to said degaussing coil arrangement and to said source for providing a path for sadi degaussing current between said coil arrangment and said source during a degaussing operation;
   first and second degaussing current reducing means coupled to said switching means;
   means for generating a signal indicative of a power status of a power supply for siad video display; and
   a control circuit coupled to said switching means and responsive to said power status indicative signal for automatically producing alternate coupling of said first and second degaussing current reducing means to said degaussing coil arrangement with respect to successive degaussing operations;
   wherein said power status indicative signal is indicative of the de-energization of said power supply, said control circuit automaticaly producing said alternate coupling upon said de-energization without initiating a degaussing operation until the next subsequent re-energization of said power supply occurs.

2. Apparatus according to claim 1 wherein each of said degaussing current reducing means includes a positive temperature coefficient of resistance element.

3. Apparatus according to claim 2 wherein each of said degaussing current reducing means includes a second positive temperature coefficient of resistance element in shunt with the first mentioned element.

4. Apparatus according to claim 1 wherein said switching means provides double-throw action for producing said alternate coupling.

5. Apparatus according to claim 1 switching means includes a relay having a section and a mechanical switch section actuated by said coil section, the two sections being separated by an electrical shock hazard isolation barrier.

6. Apparatus according to claim 1 including manually operated means operating in conjunction with said switching means for manually initiating said degaussing operation in a manner that produces said alternate coupling upon successive operation of said manually operated means.

7. Apparatus according to claim 1 including manually operated means operating in conjunction with said switching means for manually initiating said degaussing operation in a manner that produces said alternate coupling upon successive operation of said manually operated means.

8. Apparatus according to claim 1 wherein said power status indicative signal comprises a voltage from a secondary winding of a power transformer that serves as an electrical shock hazard isolation barrier.

9. Apparatus according to claim 8 wherein said switching means includes a relay having a coil section and a mechanical switch section actuated by said coil section, the two sections being separated by an electrical shock hazard isolation barrier.

10. A degaussing apparatus for a video display comprising:
    a degaussing coil arrangement;
    a source of degaussing current;
    switching means coupled to said degaussing coil arrangement and to said source for providing a path for said degaussing current between said coil arrangment and said source during a degaussing operation;
    first and second degaussing current reducing means coupled to said switching means;
    means for generating a signal indicative of a power status of a power supply for said video display; and
    a control cirucuit coupled to said switching means and responsive to said power status indicative signal for automatically producing alternate coupling of said first and second degaussing current reducing means to said degaussing coil arrangement with respect to successive degaussing operations;
    wherein said generating means generates said power status indicative signal upon de-energization of said power supply to automatically change the coupling of said degaussing coil arrangement from one of the two degaussing current reducing means to the other one, such that upon the next subsequent re-energization of said power supply, current from said source flows in said other one degaussing current reducing means.

* * * * *